United States Patent
Cope et al.

(10) Patent No.: US 9,424,210 B1
(45) Date of Patent: Aug. 23, 2016

(54) SDRAM MEMORY ORGANIZATION AND EFFICIENT ACCESS

(75) Inventors: Benjamin Thomas Cope, London (GB); Kulwinder Dhanoa, Windsor Berkshire (GB); Lei Xu, High Wycombe Buckinghamshire (GB)

(73) Assignee: Altera Corporation, San Jose, CA (US)

( * ) Notice: Subject to any disclaimer, the term of this patent is extended or adjusted under 35 U.S.C. 154(b) by 475 days.

(21) Appl. No.: 12/910,423

(22) Filed: Oct. 22, 2010

(51) Int. Cl.
*G06F 13/16* (2006.01)
*G06F 12/06* (2006.01)

(52) U.S. Cl.
CPC ........ *G06F 13/1631* (2013.01); *G06F 12/0607* (2013.01); *G06F 13/1647* (2013.01); *G06F 13/1626* (2013.01)

(58) Field of Classification Search
None
See application file for complete search history.

(56) References Cited

U.S. PATENT DOCUMENTS

| | | | | |
|---|---|---|---|---|
| 5,966,734 | A * | 10/1999 | Mohamed et al. | 711/173 |
| 6,976,135 | B1 * | 12/2005 | Talbot et al. | 711/151 |
| 7,363,406 | B2 | 4/2008 | Chai et al. | |
| 7,376,803 | B1 * | 5/2008 | Eckert | 711/158 |
| 2002/0031086 | A1 * | 3/2002 | Welin | G10L 25/78 370/229 |
| 2005/0289319 | A1 * | 12/2005 | Kang | 711/200 |
| 2007/0156946 | A1 * | 7/2007 | Lakshmanamurthy et al. | 711/5 |
| 2008/0109613 | A1 * | 5/2008 | Jarosh et al. | 711/154 |
| 2008/0320476 | A1 * | 12/2008 | Wingard et al. | 718/101 |
| 2009/0198965 | A1 * | 8/2009 | Arimilli | G06F 9/30043 712/207 |
| 2009/0325585 | A1 * | 12/2009 | Farajidana et al. | 455/450 |

OTHER PUBLICATIONS

Rixner, S.; Daily, W.J.; Kapasi, U.J.; Mattson, P.; Owens, J.D.; , "Memory access scheduling," Computer Architecture, 2000. Proceedings of the 27th International Symposium on , vol., No., pp. 128-138, Jun. 14-14, 2000.*
Chang Joo Lee, Veynu Narasiman, Onur Mutlu, and Yale N. Patt. 2009. Improving memory bank-level parallelism in the presence of prefetching. In Proceedings of the 42nd Annual IEEE/ACM International Symposium on Microarchitecture (MICRO 42). ACM, New York, NY, USA, 327-336.*
Zhao Zhang, Zhichun Zhu, and Xiaodong Zhang. 2000. A permutation-based page interleaving scheme to reduce row-buffer conflicts and exploit data locality. In Proceedings of the 33rd annual ACM/IEEE international symposium on Microarchitecture (MICRO 33). ACM, New York, NY, USA, 32-41.*
Section II DDR3 SDRAM Controller with Altmemphy IP, Jul. 2010, pp. 3-1-3-16 (especially p. 3-15), Altera Corporation, San Jose, CA.

* cited by examiner

*Primary Examiner* — Edward Dudek, Jr.
*Assistant Examiner* — Ralph A Verderamo, III
(74) *Attorney, Agent, or Firm* — Elaine Lee; Michael Mauriel (57) ABSTRACT

Various structures and methods are disclosed related to efficiently accessing a memory for a particular application. An embodiment of the present invention utilizes characteristics of an access pattern for a particular application to provide a more efficient organization of data in a memory. In one embodiment, the predictability in access needs for a particular application is exploited to provide a data organization method for organizing data in an SDRAM memory to support efficient access. In one embodiment, the particular application is operation under the Long Term Evolution ("LTE") standard for wireless communications. In one embodiment, associated hardware and methods are provided to, when necessary, reorder read commands and, when necessary, reorder data read from memory so that at least some of the time overhead for accessing one row can be hid behind an access of another row.

21 Claims, 8 Drawing Sheets

BANK 0

| Column group | | c0 | | c1 | | c2 | | c3 | | c4 | |
|---|---|---|---|---|---|---|---|---|---|---|---|
| Symbol | ROW | A0 | A1 | A0 | A1 | A0 | A1 | A0 | A1 | A0 | A1 |
| S0 | r0 | 0-1 | 0-1 | 4-5 | 4-5 | 8-9 | 8-9 | 12-13 | 12-13 | 16-17 | 16-17 |
|  | r1 | 20-21 | 20-21 | 24-25 | 24-25 | 28-29 | 28-29 | 32-33 | 32-33 | 36-37 | 36-37 |
| S1 | r2 | 2-3 | 2-3 | 6-7 | 6-7 | 10-11 | 10-11 | 14-15 | 14-15 | 18-19 | 18-19 |
|  | r3 | 22-23 | 22-23 | 26-27 | 26-27 | 30-31 | 30-31 | 34-35 | 34-35 | 38-39 | 38-39 |
| S2 | r4 | 0-1 | 0-1 | 4-5 | 4-5 | 8-9 | 8-9 | 12-13 | 12-13 | 16-17 | 16-17 |
|  | r5 | 20-21 | 20-21 | 24-25 | 24-25 | 28-29 | 28-29 | 32-33 | 32-33 | 36-37 | 36-37 |
| S3 | r6 | 2-3 | 2-3 | 6-7 | 6-7 | 10-11 | 10-11 | 14-15 | 14-15 | 18-19 | 18-19 |
|  | r7 | 22-23 | 22-23 | 26-27 | 26-27 | 30-31 | 30-31 | 34-35 | 34-35 | 38-39 | 38-39 |

BANK 1

| Column group | | c0 | | c1 | | c2 | | c3 | | c4 | |
|---|---|---|---|---|---|---|---|---|---|---|---|
| Symbol | ROW | A0 | A1 | A0 | A1 | A0 | A1 | A0 | A1 | A0 | A1 |
| S0 | r0 | 2-3 | 2-3 | 6-7 | 6-7 | 10-11 | 10-11 | 14-15 | 14-15 | 18-19 | 18-19 |
|  | r1 | 22-23 | 22-23 | 26-27 | 26-27 | 30-31 | 30-31 | 34-35 | 34-35 | 38-39 | 38-39 |
| S1 | r2 | 0-1 | 0-1 | 4-5 | 4-5 | 8-9 | 8-9 | 12-13 | 12-13 | 16-17 | 16-17 |
|  | r3 | 20-21 | 20-21 | 24-25 | 24-25 | 28-29 | 28-29 | 32-33 | 32-33 | 36-37 | 36-37 |
| S2 | r4 | 2-3 | 2-3 | 6-7 | 6-7 | 10-11 | 10-11 | 14-15 | 14-15 | 18-19 | 18-19 |
|  | r5 | 22-23 | 22-23 | 26-27 | 26-27 | 30-31 | 30-31 | 34-35 | 34-35 | 38-39 | 38-39 |
| S3 | r6 | 0-1 | 0-1 | 4-5 | 4-5 | 8-9 | 8-9 | 12-13 | 12-13 | 16-17 | 16-17 |
|  | r7 | 20-21 | 20-21 | 24-25 | 24-25 | 28-29 | 28-29 | 32-33 | 32-33 | 36-37 | 36-37 |

400
(logic for block 301 of Figure 3)

500
(data reorder logic for block 308 of Figure 3)

SDRAM MEMORY ORGANIZATION AND EFFICIENT ACCESS

FIELD OF THE INVENTION

This invention relates generally to the area of memory access.

BACKGROUND

System on-chip architectures often present a heavy burden on external memory access. A large number of masters require accesses through a single memory controller. Row change overhead is a significant source of inefficiency in SDRAM memory access. Rows must be activated and precharged before being read or written to. Preferably, consecutive accesses to two different rows in the same bank should be avoided. However, uncertainty in access requirements makes such inefficient access patterns difficult to avoid.

SUMMARY

Some applications, however, have predictable access patterns. An embodiment of the present invention utilizes such predictability to provide a more efficient organization of data in a memory. In one embodiment, the predictability in access needs for a particular application is exploited to provide a method for organizing data in an SDRAM memory to support efficient access. In one embodiment, the particular application is operation under the Long Term Evolution ("LTE") standard for wireless communications. In one embodiment, associated hardware and methods are provided to, when necessary, reorder read commands and, when necessary, reorder data read from memory so that at least some of the time overhead for accessing one row can be hid behind an access of another row.

BRIEF DESCRIPTION OF THE DRAWINGS

For purposes of illustration only, several aspects of particular embodiments of the invention are described by reference to the following figures.

DETAILED DESCRIPTION

The following description is presented to enable any person skilled in the art to make and use the invention, and is provided in the context of particular applications and their requirements. Various modifications to the exemplary embodiments will be readily apparent to those skilled in the art, and the generic principles defined herein may be applied to other embodiments and applications without departing from the spirit and scope of the invention. Thus, the invention is not intended to be limited to the embodiments shown, but is to be accorded the widest scope consistent with the principles and features disclosed herein.

Figure 1:
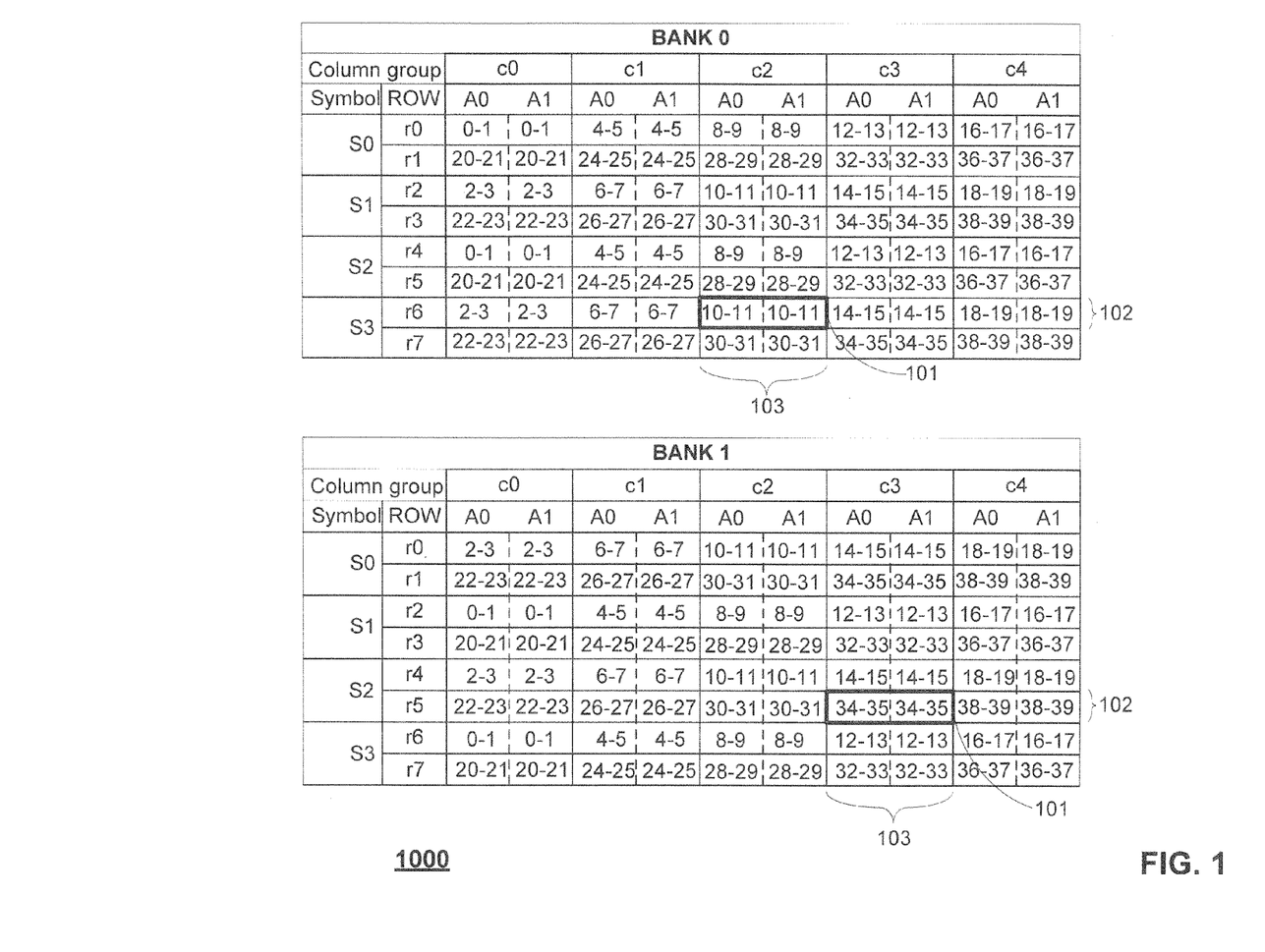
FIG. 1 illustrates an exemplary memory and a memory data organization. The illustrated memory data organization results from a method in accordance with an embodiment of the present invention.

FIG. 1 illustrates an exemplary memory portion 1000. Memory portion 1000 includes two banks, BANK 0 and BANK 1. Each bank has a plurality of cells 101 arranged in an array of rows 102 (labeled r0-r7 in each bank) and column groups 103 (labeled c0-c4 in each bank). Column groups 103 are called "groups" because each, in a given row, includes a plurality of individual memory bit circuits. As a result, each cell 101 holds a plurality of bits. In this particular example, the bit width of each column group is equal to an integer multiple of the memory's "burst" size, the smallest amount of addressable data that can be read out at one time.

FIG. 1 also represents a memory organization resulting from a method of organizing data locations in a memory for a particular application, the method being consistent with one embodiment of the present invention. In this particular example, the relevant application is wireless communication under the Long Term Evolution ("LTE") standard. In LTE, the communication frequency spectrum is divided into resource blocks ("RBs"). In the frequency domain, each RB is divided into samples. When converted to the time domain, multiple symbols correspond to each resource block. Thus, for purposes of representing data storage in a memory for LTE communications, one can group time-domain data by RBs and symbols. In a cell tower base station application, this data has to be handled for each antenna. Typically, data is requested in groups of RBs for particular antennas and all symbols will be read for each RB requested.

In the organization illustrated in FIG. 1, the data is arranged so that RBs for two antennas, A0 and A1 are read together. The cell defined by row r0 and column group c0 in BANK 0 holds the data corresponding to symbol S0 in RBs 0-1 for antennas A0 and A1. The data is arranged so that data for a given symbol for two RBs for each antenna are within the same multi-bit cell 101 (contiguous bursts in the same row) and can therefore be read together. Furthermore, the data is arranged such that as consecutive symbols are read within the same pair of RBs, accesses alternate between BANK 0 and BANK 1. For example, a request to read RBs 0 and 1, all symbols, for antennas A0 and A1 can be met with the following read access sequence:

TABLE 1

| Access No. | Location read | Data read |
|---|---|---|
| 1 | BANK 0, row r0, column group c0 | For A0, A1 RBs 0-1, symbol s0 |
| 2 | BANK 1, row r2, column group c0 | For A0, A1 RBs 0-1, symbol s1 |
| 3 | BANK 0, row r4, column group c0 | For A0, A1 RBs 0-1, symbol s2 |
| 4 | BANK 1, row r6, column group c0 | For A0, A1 RBs 0-1, symbol s3 |

In the above example, the requested data can be provided with a sequence of accesses that meets the criteria of reading first from BANK 0 and then from BANK 1. However, a memory organization resulting from a method embodying the present invention may require, in some instances, a reordering of read commands and resulting returning data to meet the criteria of reading first from BANK 0 and then from BANK 1. For example, if the request referenced above is followed by a request to read RBs 2 and 3, all symbols, for antennas A0 and A1, then the resulting read commands need to be reordered such that the symbols are read out of order but the criteria of accessing BANK 0 followed by BANK 1 is followed. The following read access sequence is one possible result from such reordering:

TABLE 2

| Access No. | Location read | Data read |
|---|---|---|
| 5 | BANK 0, row r2, column group c0 | For A0, A1 RBs 2-3, symbol S1 |
| 6 | BANK 1, row r0, column group c0 | For A0, A1 RBs 2-3, symbol S0 |
| 7 | BANK 0, row r6, column group c0 | For A0, A1 RBs 2-3, symbol S3 |
| 8 | BANK 1, row r4, column group c0 | For A0, A1 RBs 2-3, symbol S2 |

The above sequence follows the criteria of accessing BANK 0 followed by BANK 1. The data read for antennas A0 and A1 in access numbers 5-8 in Table 2 can be reordered to correspond to the order requested by simply flipping the S1 data for RBs 2-3 (read in access 5) with the S0 data (read in access 6) and flipping the S3 data read in access 7 with the S2 data read in access 8. Circuits and methods for tracking and carrying out such data reordering are further described herein in the context of other figures.

In other examples, data may be requested for a single RB but retrieved for an additional RB. For example, a request to read RB 0, all symbols, for antennas A0, A1 might trigger the same accesses described in Table 1 above, i.e., RBs 0 and 1 are read, all symbols, for A0, A1. In such an example, RB 1 data can be retrieved from the external memory and then held in a temporary storage circuit on-chip for use in response to a subsequent request. Circuits and methods for tracking and carrying out such holding of data for subsequent requests are further described herein in the context of other figures.

Those skilled in the art will appreciate that the example of FIG. 1 is simplified in certain respects. For example, RBs typically have more than four symbols of data per RB. In a typical implementation, an RB will have 12 or 14 symbols. However, the above example only shows four symbols for each RB (S0, S1, S2, and S3) for purposes of not overcomplicating the drawings and to facilitate illustrating the principles of an embodiment of the present invention.

Those skilled in the art will also appreciate that although specific examples for accessing the memory and data represented in FIG. 1 have been described in the context of read accesses, the inventive principles illustrated herein apply equally in the context of write accesses. Specifically, both the memory organization shown and described in FIG. 1 and the method for obtaining that organization shown and described in FIG. 2 provide benefits for more efficient access to a memory in the context of a particular application and those benefits apply whether the accesses are write accesses or read accesses.

Figure 2:
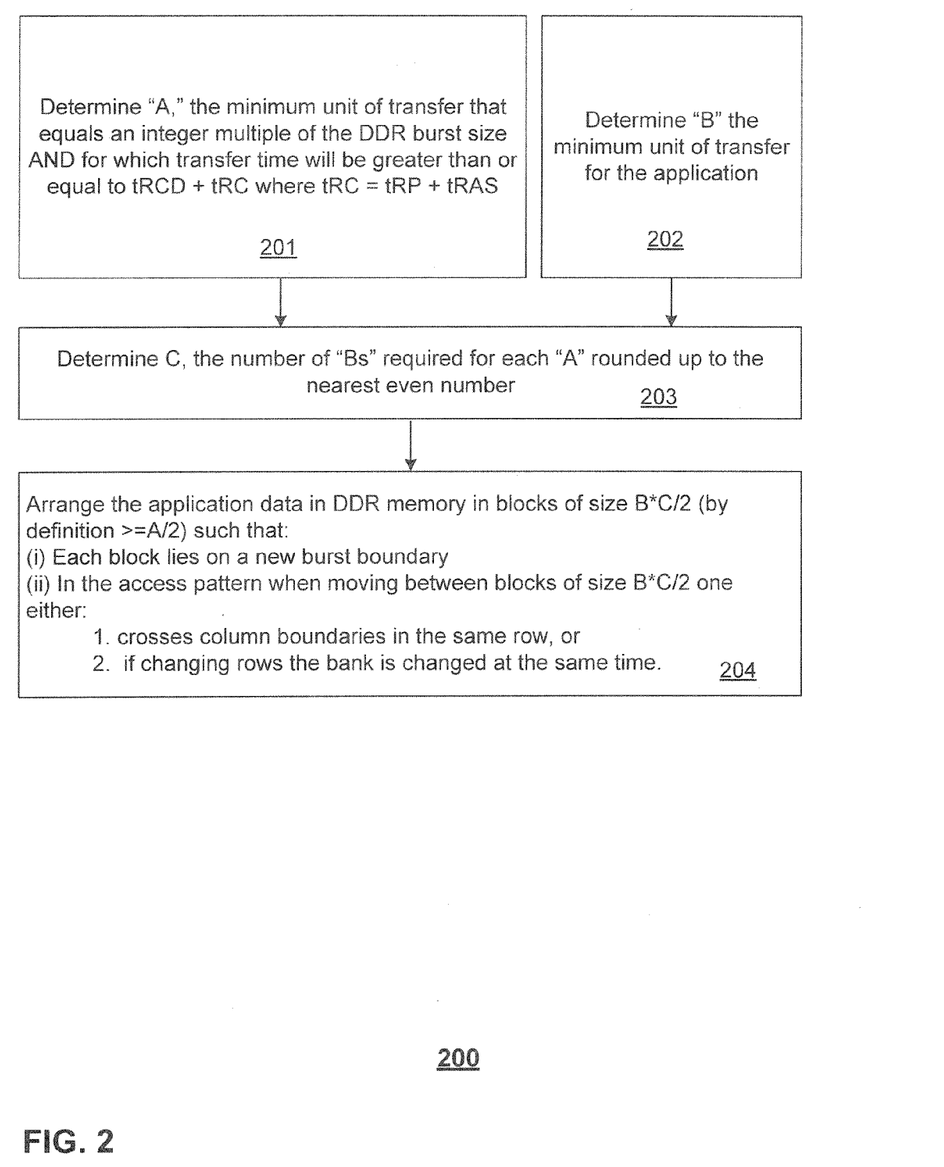
FIG. 2 illustrates an exemplary method for determining an efficient memory data organization for a particular application, the method being in accordance with an embodiment of the present invention.

FIG. 2 illustrates an exemplary method 200 for determining an efficient external memory data organization for a particular application, the method being in accordance with an embodiment of the present invention. The memory organization shown in FIG. 1 can be achieved using method 200 in the context of LTE applications. However, those skilled in the art will appreciate that method 200 can potentially be applied to organize memory for other applications that have some predictability in access patterns without necessarily departing from the spirit and scope of the present invention.

Step 201 determines "A," the minimum unit of transfer that equals an integer multiple of the memory burst size and for which transfer time will be greater than row command delay ("tRCD") plus row cycle time ("tRC") where tRC equals row pre-charge delay ("tRP") plus row access strobe delay ("tRAS"). As those skilled in the art will appreciate, tRCD, tRC, tRP, and tRAS are all well known memory timing parameters associated with DRAM and SDRAM memories. The size of A will depend on the memory speed and the burst length. In one example, a DDR3 memory running at 400 MHz, the size of A is 8 bursts (4 to each bank), assuming a burst length of 8 beats. The amount of data transferred on a beat may vary depending on the memory structure, but in one example, 32-bits are transferred on each beat.

Step 202 determines "B," the quantity of data comprising a minimum unit that would be requested under the application. This will vary from application to application. In the case of LTE, the minimum unit is the number of bits required to represent a sample multiplied by the number of samples in a RB then by the number of antennas. This will vary depending on the implementation constraints (e.g., number of antennas and available bandwidth). In one example of an LTE compliant implementation, a sample is represented with 32-bits, there are 12 samples in one RB, and data for two antennas is handled together. The smallest data unit that would be requested is one RB for two antennas. In this example, that corresponds to 32*12*2=784 bits=3 bursts, assuming, again, 32 bits per beat and 8 beats per burst. Therefore, the size of B is 3 bursts.

Step 203 uses the results of steps 201 and 202 and determines C, the number of units of amount B necessary to constitute a minimum transfer unit A with the constraint that C has to be an even number. In other words, C is the result of A divided by B rounded up to the nearest even number. Because 8 bursts divided by 3 bursts equals 2 and $\tfrac{2}{3}$, C is that result rounded up to the nearest even number, i.e., C is 4.

Step 204 arranges the data locations in the size of blocks B*C/2 (by definition equal to or greater than A/2). In this example, B*C/2 is 48 beats of 32-bit words or 6 bursts. In step 204, the arrangement should be such that in moving from one such data block to another, one crosses column boundaries in the same row (i.e., the two blocks are contiguous in a row) or, if in different rows, that the two rows are in different banks. Step 204 can be performed using various known techniques such as integer linear programming or, by simply examining the block size and the memory structure, the step in some examples could be performed by inspection.

Figure 3:
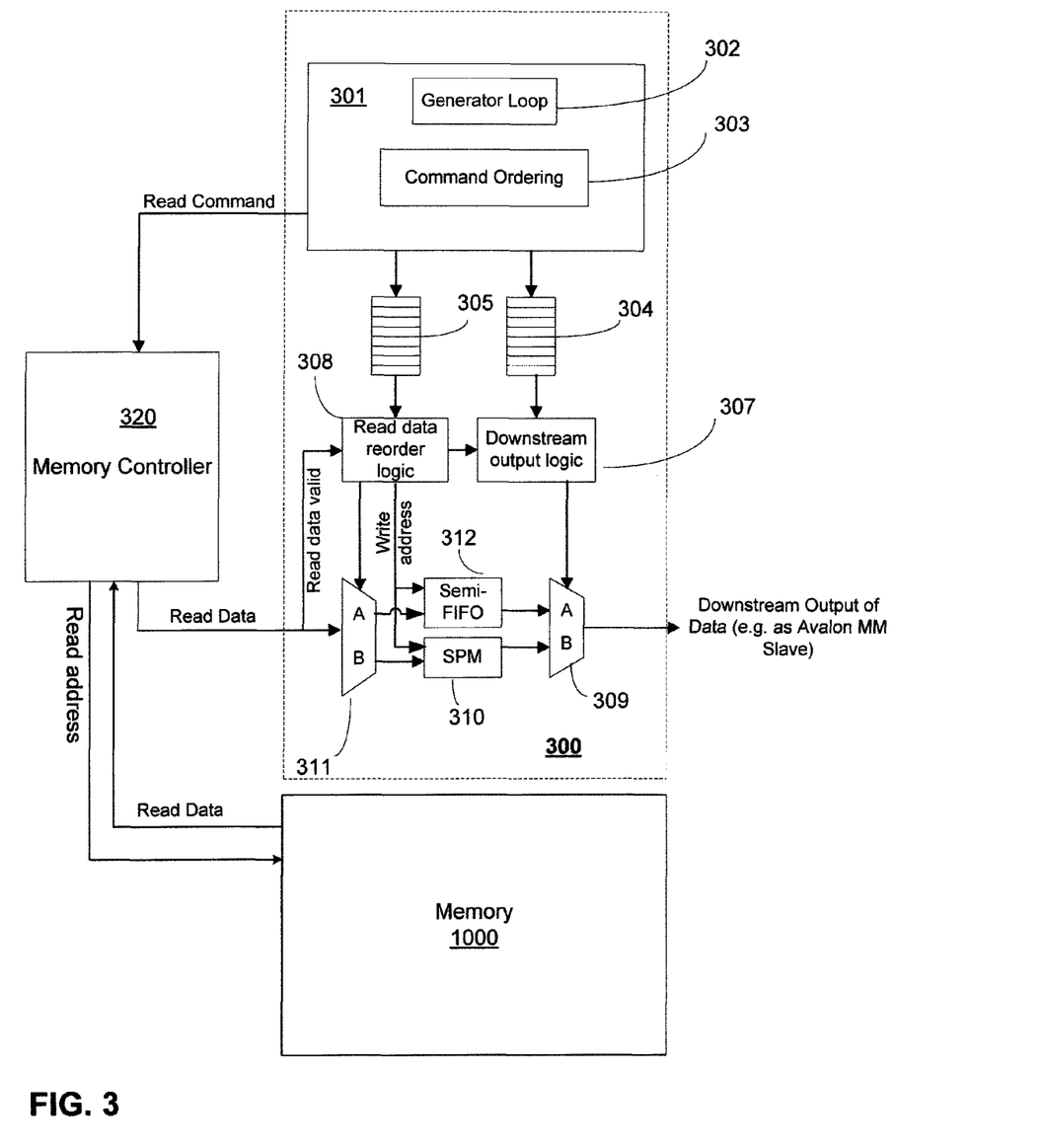
FIG. 3 illustrates an exemplary memory management unit ("MMU") for managing read accesses of a memory such as the memory of FIG. 1, the MMU being in accordance with an embodiment of the present invention.

FIG. 3 illustrates an exemplary memory management unit ("MMU") 300 for managing read accesses of memory 1000. MMU 300 is coupled to manage read accesses to memory 1000 through memory controller 320. In some embodiments an MMU in accordance with the present invention might be implemented as part of a memory controller, but in this example, it is shown as a circuitry block outside of the memory controller.

Based on a request from a master operating under the relevant application (in this case LTE communication), MMU 300 provides read commands to memory controller 320 which obtains data stored in memory 1000 and provides the obtained data to MMU 300. MMU 300 then reorders and/or temporarily stores the data as needed so that data can be provided downstream in an order consistent with the original application request.

MMU 300 includes read command logic 301, memory side context queue 305, downstream side context queue 304, read data reorder logic 308, downstream output logic 307, input selection circuit 311, semi-FIFO 312, scratch pad memory ("SPM") circuit 310, and output selection circuit 309, all coupled as shown.

Read command logic 301 includes generator loop circuitry 302 and command ordering circuitry 303. Generator loop 302 receives requests for data from elsewhere in the system and generates read commands as necessary to be used for accessing data from external memory 1000. Command ordering logic 303 determines whether generated read commands need to be reordered to satisfy the requirement that consecutive reads access rows in different banks, and if so, those read commands are reordered before being sent to memory controller 320. Read command logic 301 also determines whether read commands generated in response to a data request will return data that, while not part of the present request, is expected to be responsive to a subsequent request. Based on whether or not read commands are reordered, and based on whether or not read commands will retrieve data that is responsive to expected subsequent requests, read command logic 301 will provide appropriate flag data to read data reorder logic 308 via memory side context queue 305. Read command logic 301 will also determine whether or not presently requested data is already stored in SPM 310. Based on that determination, read command logic 301 will provide appropriate flag data to downstream output logic 307 via downstream side context queue 304. The logic implemented by read command logic 301 is further illustrated and described in the context of FIGS. 4a-4b. Although FIG. 3 illustrates separate blocks for generator loop 302 and command ordering logic 303, that is for purposes of ease of illustration. In practice, command generating and ordering logic might not be separate circuitry blocks in a particular implementation. Alternatively, read command logic 301 might be carried out by a greater number of distinct logic blocks than that shown in FIG. 3.

Memory side context queue 305 and downstream side context queue 304 provide timed relay of necessary context data from read command logic 301 to read data reorder logic 308 and downstream output logic 307. In particular, memory side context queue 305 relays data indicating: (i) whether read commands for the present request were reordered and (ii) whether read commands will return data that is not for the present request but rather is for an expected subsequent request. Downstream side context queue 304 relays data indicating whether the presently requested data was retrieved by earlier read commands and would therefore be in SPM 310.

Read data reorder logic 308 determines whether valid data is present at input selection circuit 311, determines whether that data should be written to semi-FIFO 312 or to SPM 310 and controls input selection circuit 311 accordingly. Read data reorder logic 308 also provides write addresses to the selected circuit (312 or 310). In this particular example, temporary storage circuits 312 and 310 are configured so that the order in which data is read out to output selection circuit 309 is predetermined based on a location in the relevant temporary storage circuit; therefore, the downstream data order can be controlled with respect to both circuits by controlling the write addresses. In one example, data is read out of both circuits 310 and 312 to output selection circuit 309 in "FIFO" fashion, for example, by advancing a read pointer through a predetermined address sequence. An embodiment of a method carried about by read data reorder logic 308 is illustrated and explained further in the context of FIG. 5.

Downstream output logic 307 determines whether the presently needed data is at semi-FIFO 312 or at SPM 310 and then controls output selection circuit 309 accordingly. An embodiment of a method carried out by downstream output logic 307 is illustrated and explained further in the context of FIG. 6.

In the presently illustrated example, input selection circuit 311 is implemented as a de-multiplexer ("demux") and output selection circuit 309 is implemented as a multiplexer ("mux"). Output A of circuit 311 is coupled to provide data read from memory 1000 to semi-FIFO 312 and output B of circuit 311 is coupled to provide such data to SPM 310. Input A of circuit 309 is coupled to receive data from semi-FIFO 312 and input B of circuit 309 is coupled to receive data from SPM 310.

Those skilled in the art will appreciate that, in alternative embodiments, a variety of on-chip temporary storage circuits could be used in place of semi-FIFO 312 and SPM 310. Any relatively small temporary storage circuit with sufficient ease of access that, preferably, has flexibility to order data using control of write and/or read side addresses will suffice. As used herein, the term "semi-FIFO" is simply used to refer to a circuit in which one of the read or write side operates in FIFO fashion and the other side can be controlled to operate in non-FIFO fashion allowing the flexibility to reorder data by controlling the write (or read) addresses. In the present example, both semi-FIFO 311 and SPM 310 are adapted to have their stored data read out in FIFO fashion but allow data to be written in non-FIFO fashion. As a result, there is no need for read addresses to be provided by downstream output logic 307 to semi-FIFO 312 or SPM 310. However, as indicated, alternative embodiments might use other types of temporary storage circuits and might incorporate logic to use read-side addresses to control data ordering.

Those skilled in the art will appreciate that although FIG. 3 shows exemplary circuitry adapted for managing read accesses, the principles underlying MMU 300 may be utilized to provide circuitry adapted for managing write accesses. As those skilled in the art would appreciate, in such write side MMU circuitry, any temporary storage circuits and associated circuitry necessary for selective data re-ordering would be provided upstream from the memory controller, rather than downstream as illustrated in the example shown in FIG. 3. In some examples, such circuitry can be implemented together in a same MMU as the circuitry illustrated in FIG. 3.

Figure 4A:
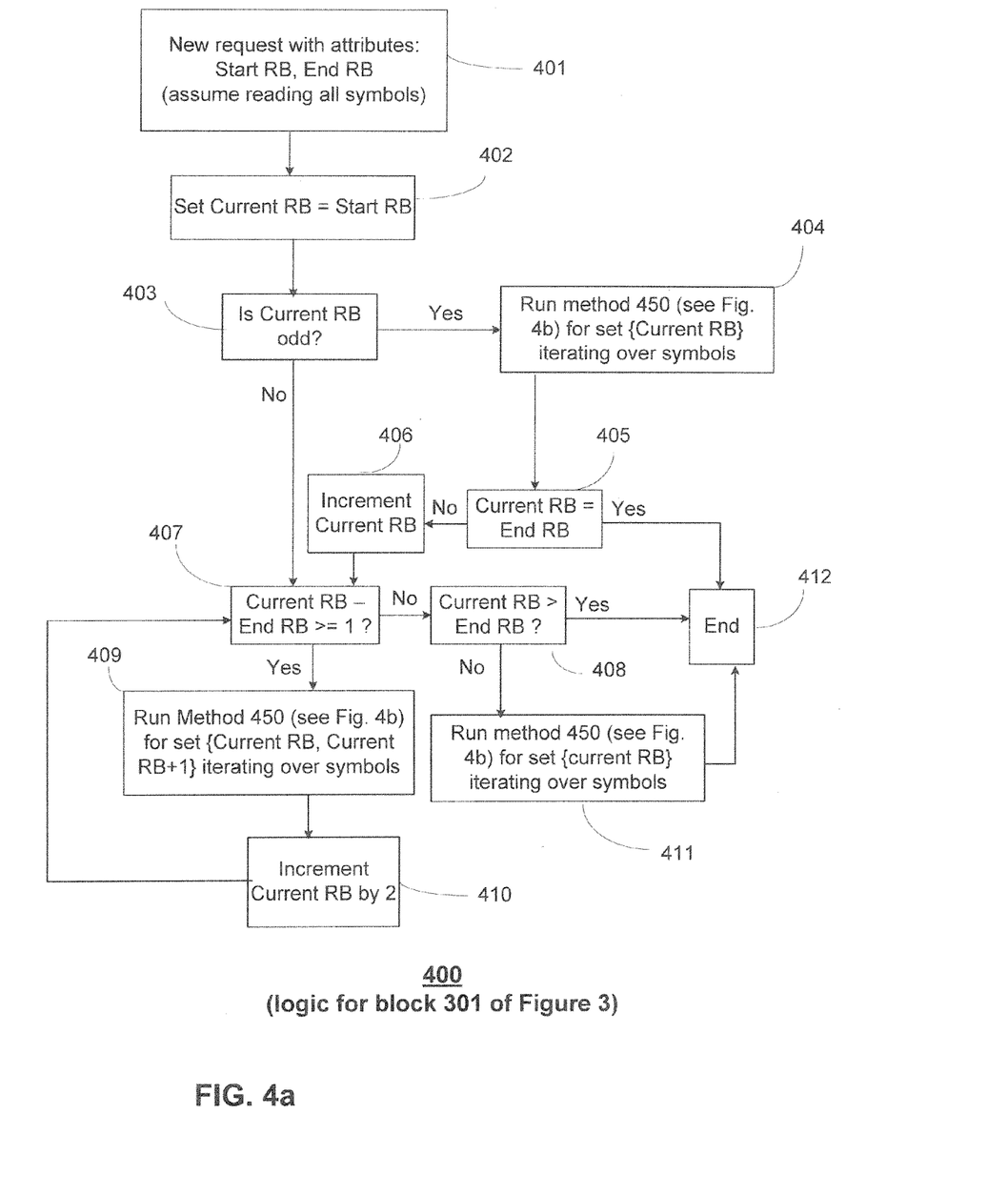
FIGS. 4a-4b illustrate an exemplary method carried out by read command logic of the embodiment of FIG. 3.
Figure 4B:
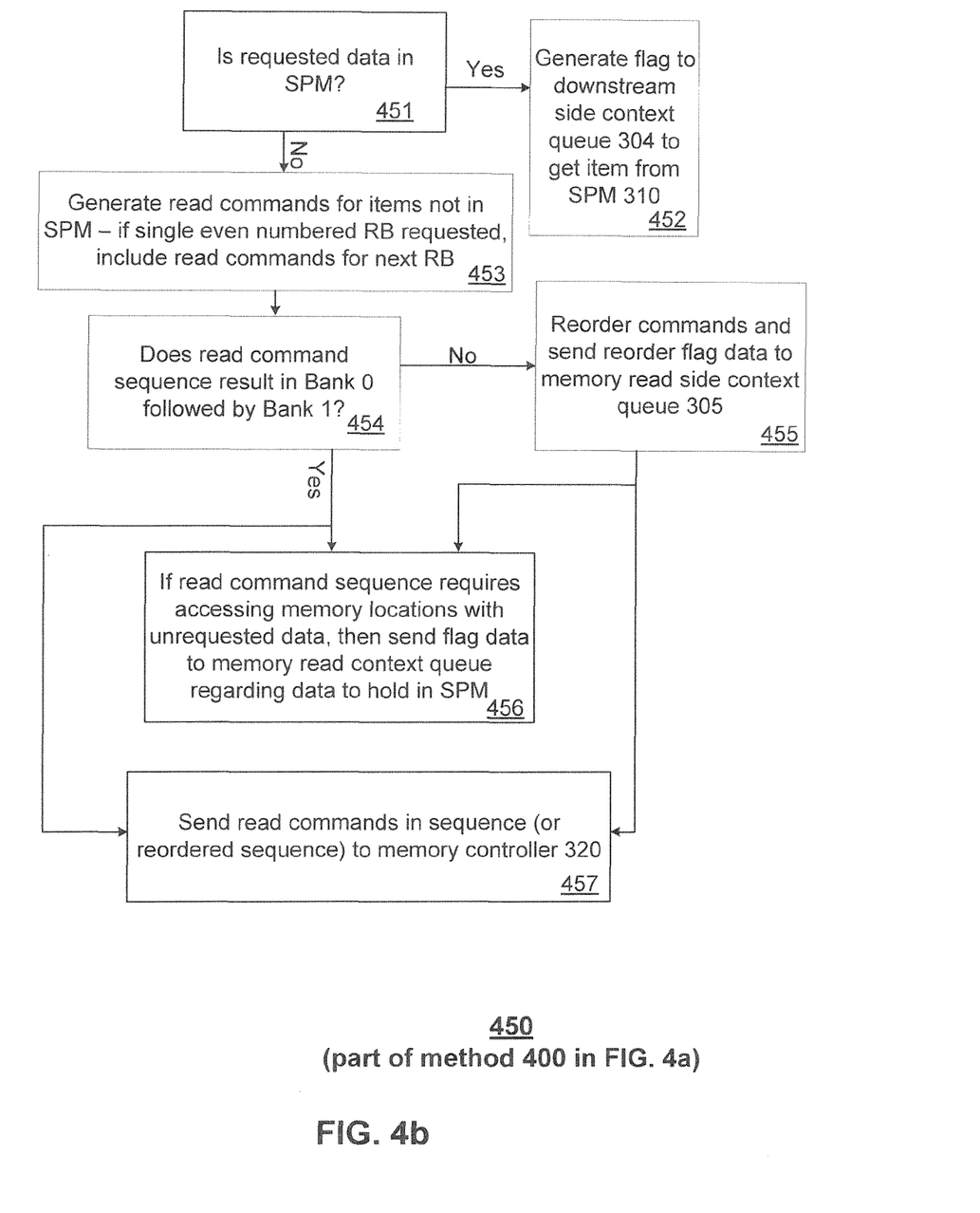

FIGS. 4a-4b illustrates a method carried out by read command logic 301 of FIG. 3 (including generator loop 302 and command ordering logic 303). FIG. 4a illustrates method 400, which includes method 450. FIG. 4b illustrates the details of method 450.

Referring to FIG. 4a, method 400 starts at step 401 in response to a request from an application for data from memory 1000. In the context of the present example, it is assumed that such requests are for at least one RB for two antennas, all symbols are read for the requested RB(s), and if multiple RBs are requested, then the RBs are requested in consecutive order. In this example, the request includes the following attributes: "Start RB" and "End RB" which reference the first RB in the list of requested RBs and the last RB. So, for example, a request of the form "3, 6" is requesting RBs 3, 4, 5, and 6, all symbols, for two antennas.

Step 402 sets the variable "Current RB" (which references the RB number to which the executing routine is currently handling) equal to Start RB from the request. Step 403 determines if the Current RB is odd (e.g., 1, 3, 5, 7, etc.). If yes, then the method proceeds to step 404 which runs method 450 (detailed in FIG. 4b) for the set {Current RB}, iterating over the symbols in that RB. From step 404, the method proceeds to step 405 which determines if Current RB=End RB (which would happen, for example, if the original request was for a single odd numbered RB). If yes, then the method ends at step 412. If no, then the method proceeds to step 406, which increments Current RB, and then to step 407. If the result of step 403 is no, then the method proceeds directly to step 407.

Step 407 determines whether Current RB−End RB≥1. In other words, it determines whether there are at least two RBs in the request remaining to be processed. If no, then the method proceeds to step 408 which determines whether Current RB>End RB. If the result of 408 is yes, then the method ends at step 412. If the result of step 408 is no, then the method proceeds to step 411 which runs method 450 (detailed in FIG. 4b) for the set {Current RB}, iterating over all symbols; the method then ends at step 412.

If the result of step 407 is yes, then the method proceeds to step 409 which runs method 450 (detailed in FIG. 4b) for the set {Current RB, Current RB+1}. The method proceeds from 409 to step 410 which increments the value of Current RB by 2 and then the method proceeds back to step 207.

Referring to FIG. 4b and method 450, step 451 determines whether the requested data is in SPM 310. If step 404 of method 400 (FIG. 4a) has invoked method 450, then, in this example, the requested data will be in SPM 310. If the result of step 451 is yes, step 452 generates a flag indicating that requested data is in SPM 310, provides the flag data to downstream side context queue 304, and method 450 ends. If step 451 determines that the requested data is not in SPM 310, then the method proceeds to step 453 which generates read commands for requested items not in SPM 310. Step 453 will generate read commands for requested data. If step 411 of method 400 has invoked method 450, then the set being processed by step 453 will include one RB and that RB will be an even number. In that case, generated read commands will include commands that also read the next RB (note that, if the requested RB is an odd number, then it will be in SPM 310 and no read commands are necessary). For example, if the request is for RB 2 (for antennas A0, A1), then step 453 will generate read commands to obtain RBs 2-3. In other words, all the data in a given cell 101 illustrated in FIG. 1 (which each contain symbol data for two RBs of two antennas) is read even if only the first RBs in that cell is the subject of the present request.

Step 454 determines whether the read command order generated in step 453 results in accessing a row in BANK 0 followed by a row in BANK 1. If no, then the method proceeds to step 455 before proceeding to steps 456 and 457. Step 455 reorders the read commands as needed to meet the criteria of accesses starting with BANK 0 followed by BANK 1. Step 455 also sends reorder flag data to the read memory side context queue. Then the method proceeds to steps 456 and 457. If the result of step 454 is yes, then the method proceeds to steps 456 and 457 directly without invoking step 455. Step 457 sends the read commands in sequence (or reordered sequence if step 455 was invoked) to memory controller 320 for accessing memory 1000. Step 456 determines if the read commands require accessing memory locations with unrequested data. If so, then step 456 sends appropriate flag data to read side context queue 305 that indicates to data reorder logic 308 such data should be stored in SPM 310.

Figure 5:
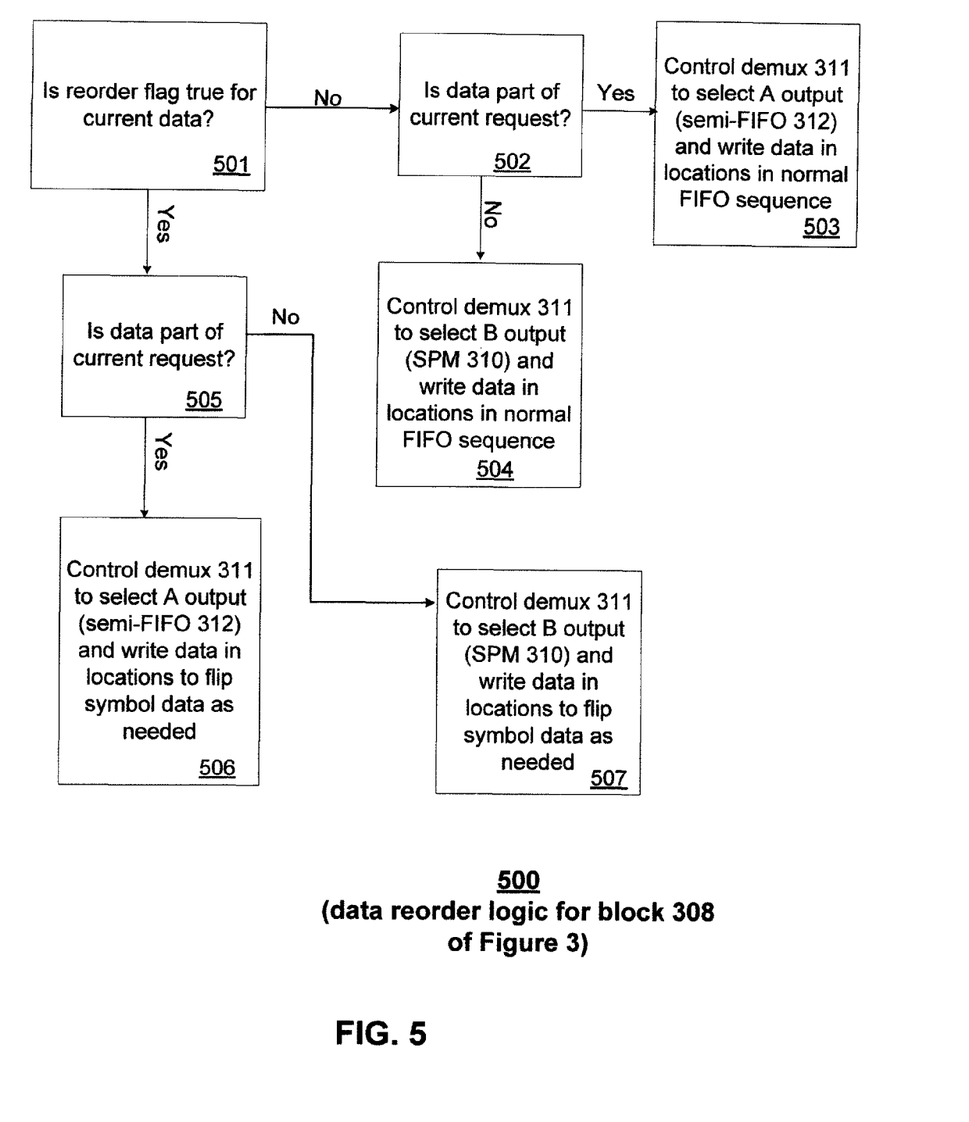
FIG. 5 illustrates an exemplary method carried out by data reorder logic of the embodiment of FIG. 3.

FIG. 5 illustrates an exemplary method 500 carried out by read data reorder logic 308 of FIG. 3. Step 501 determines whether reorder flag (received from read command logic 301 via context queue 305) is true for current data. If no, then method 500 proceeds to step 502 which determines whether the current data is part of the current request. If yes, then step 503 controls demux 311 to select its A output (coupled to provide output to semi-FIFO 312) and write addresses are provided for semi-FIFO 312 data such that data is written in normal FIFO sequence (i.e., so that it will be read out of circuit 312 in the same order it was provided from memory controller 320). If the result of step 502 is no, then step 504 controls demux 311 to select its B output (coupled to provide output to SPM 310) and write address are provided to SPM 310 such that data is written in normal FIFO sequence (i.e., so that it will be read out of SPM 310 in the same order it was provided from memory controller 320). If the result of step 501 is yes, the method proceeds to step 505 (identical to step 502) and determines whether the current data is part of the current request. If yes, then step 506 controls demux 311 to select controls demux 311 to select its A output and write addresses are provided for semi-FIFO 312 data such that data is written in a reordered sequence (i.e., so that it will be read out of circuit 312 in a different order than it was provided from memory controller 320; the different order matching the data order sought by the original request). If the result of step 505 is no, then step 507 controls demux 311 to select its B output and write addresses are provided to SPM 310 such that data is written in a reordered sequence (i.e., so that it will be read out of SPM 310 in a different order than it was provided from memory controller 320; the different order matching the data order sought by the original request).

Figure 6:
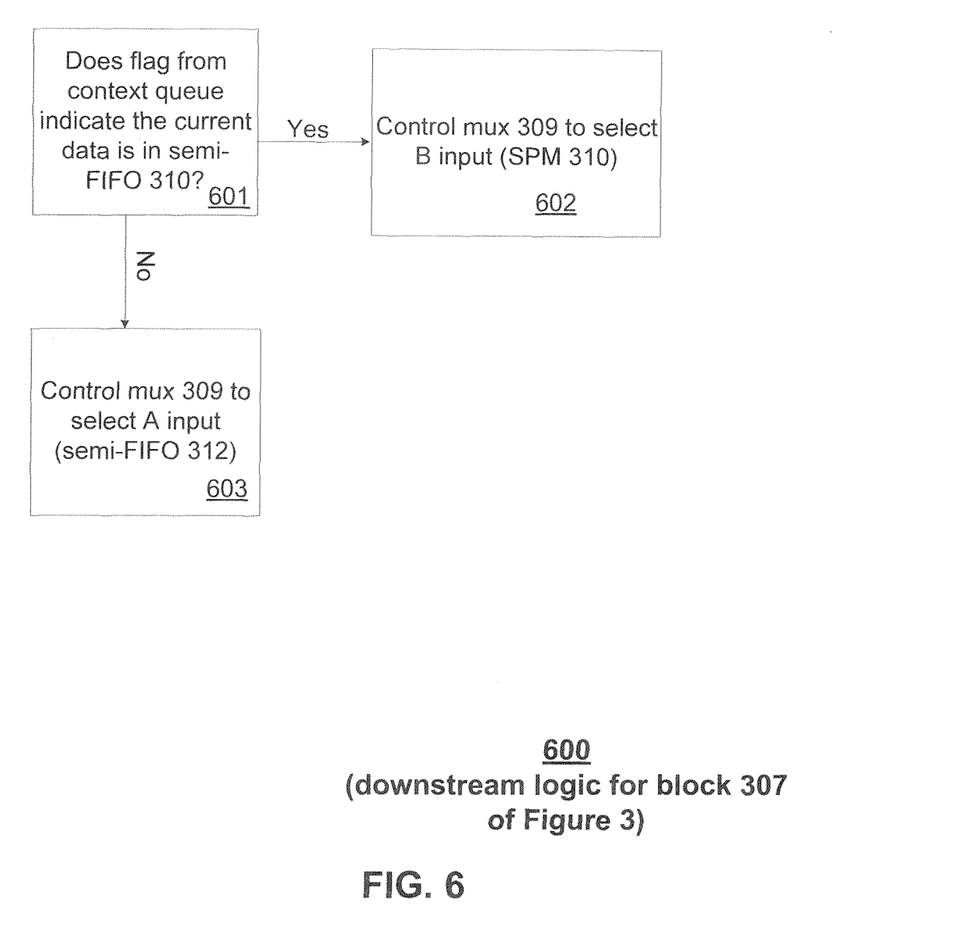
FIG. 6 illustrates an exemplary method carried out by downstream output logic of the embodiment of FIG. 3.

FIG. 6 illustrates a method 600 carried out by downstream output logic 307 of FIG. 3. Step 601 determines if the flag data received from context queue 304 indicates that the current data is in SPM 310. If yes, then step 602 controls mux 309 to select its B input (coupled to the output of SPM 310). If no, then step 603 controls mux 309 to select its A input (coupled to the output of semi-FIFO 312).

Figure 7:
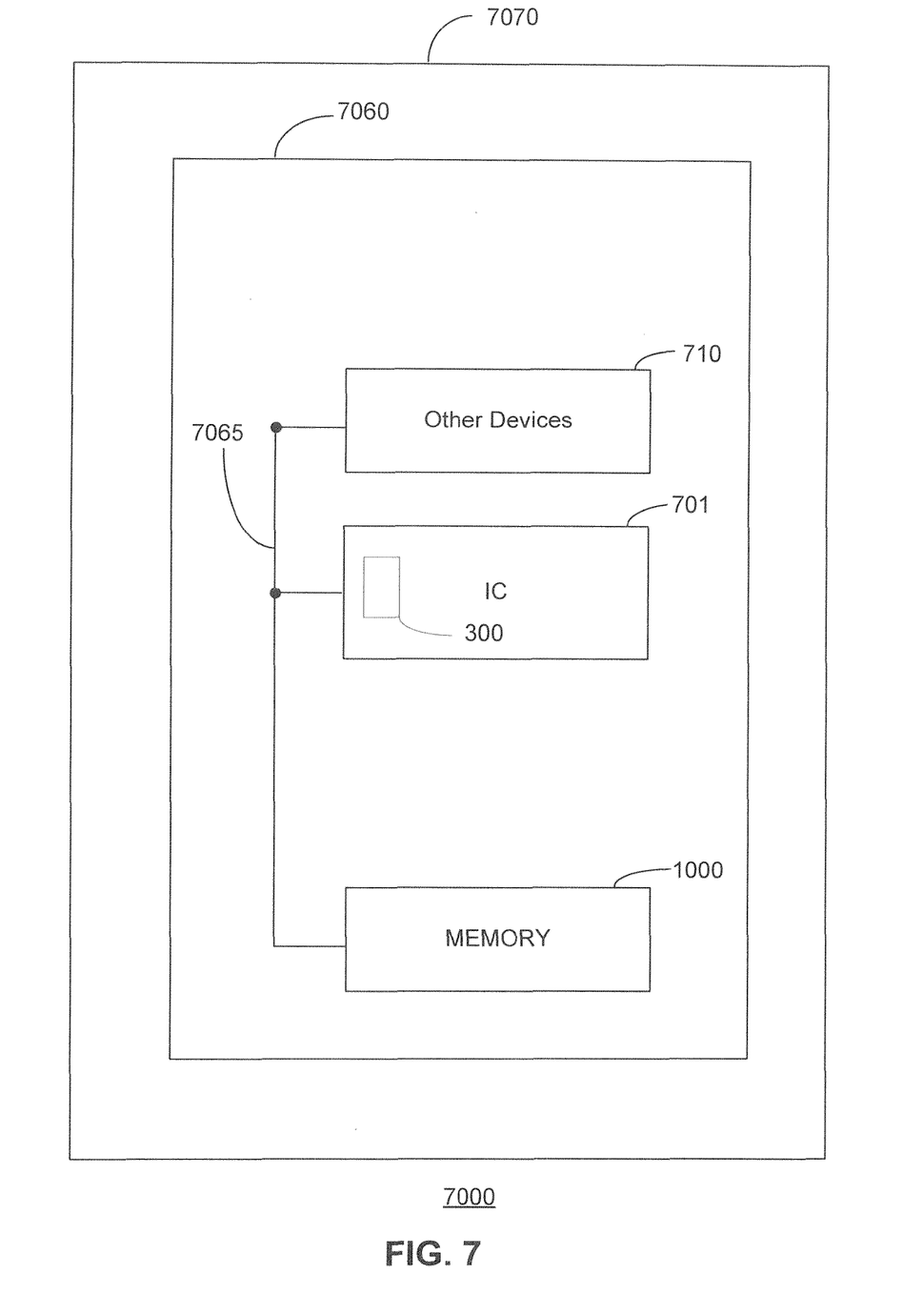
FIG. 7 illustrates an exemplary data processing system in according with an embodiment of the present invention. The illustrated system includes an integrated circuit ("IC"), the IC including the MMU of FIG. 3 for managing requests for data stored in the memory of FIG. 1.

FIG. 7 illustrates an exemplary data processing system 7000 including integrated circuit ("IC") 701. IC 701 includes MMU 300 of FIG. 3 for managing requests for data stored in memory 1000 of FIG. 1. Several system masters on IC 700 might need, at various times, to send data requests to MMU 300 to obtain data stored in memory 1000. MMU 300 in turn will manage generating read commands for obtaining data from memory 1000 via a memory controller on IC 701 (memory controller not separately shown in FIG. 7) and will manage ordering the return data in accordance with the requests. Although this embodiment shows an IC with a single MMU, alternative embodiments may have multiple MMUs as described herein without departing from the spirit and scope of the present invention.

Data processing system 7000 may include other devices 710. In a base station application for a cell tower, other devices 710 would include an RF card. While the data memory organization illustrated in FIG. 1 and the various specific examples herein have been in the context of an LTE application, in other embodiments, a system such as system 7000 might be used in a wide variety of applications, such as computer networking, data networking, instrumentation, video processing, digital signal processing, and others to that extent those applications have access patterns that can be exploited by the principles of the present invention. The components of system 7000 are coupled together by system bus 7065 and are populated on circuit board 7060 which is contained in end-user system 7070. A data processing system such as system 7000 may include a single end-user system such as end-user system 7070 or may include a plurality of systems working together as a data processing system. In one embodiment, system 7000 is a digital system. As used herein a digital system is not intended to be limited to a purely digital system, but also encompasses hybrid systems that include both digital and analog subsystems.

Embodiments of this invention have been described in the context of accessing an external memory, i.e., one that is off-chip but on the same circuit board. While the invention is presently most useful in this context, those skilled in the art will recognize that the principles of the invention might apply to alternative embodiments implemented in a context where the memory being accessed is on the same IC as the relevant memory management unit. Although this is unlikely today given presently available IC fabrication processes for SDRAM and DRAM chips (which are different than the processes used for the types of ICs that would be typically be used to manage an LTE or other data processing application) such alternatives may arise more readily in the future and the underlying principles of the embodiments of the present invention might be applicable to such future alternatives.

While the invention has been particularly described with respect to the illustrated embodiments, it will be appreciated that various alterations, modifications and adaptations may be made based on the present disclosure, and are intended to be within the scope of the invention. While the invention has been described in connection with what are presently considered to be the most practical and preferred embodiments, it is to be understood that the invention is not limited to the disclosed embodiments but only by the following claims.

What is claimed is:

1. A method of organizing data in a memory for a particular application, the memory including a plurality of banks, each bank including a plurality of rows, the method comprising:
    arranging data locations in the memory such that, for access commands generated during normal operation of the particular application, access commands generated in an order corresponding to a data order requested for the particular application can be ordered so that consecutive memory accesses do not access different rows in a same bank of the memory by: if consecutively generated access commands do not require accessing different rows in a same bank of the memory, then leaving the consecutively generated access commands in their generated order and, if consecutively generated access commands require accessing different rows in a same bank of the memory, then switching an order of one or more pairs of consecutively generated access commands and only such switching reorders the access commands during the entirety of normal operation of the particular application so that consecutive memory accesses do not access different rows in a same bank of the memory.

2. The method of claim 1 wherein data locations are arranged such that a first access to a row in one bank is long enough that row activation for a second access can begin before the first access ends, the second access being of a row in another bank.

3. The method of claim 1 wherein the access commands are write commands.

4. The method of claim 1 wherein the access commands are read commands and wherein, if ordering read commands to avoid consecutive accesses to different rows in a same bank of the memory results in retrieved data being in an order that is different than a requested data order of the particular application, the retrieved data is operable to be reordered consistent with the requested data order.

5. The method of claim 4 wherein the retrieved data is operable to be reordered by reordering a sequence of application data units retrieved under the request, an application data unit being a grouping of data defined by the particular application.

6. The method of claim 5 wherein the particular application is wireless communication under the long term evolution ("LTE") standard for wireless communication and the application data unit is a symbol within a resource block associated with an antenna.

7. A method of organizing data in a memory for a particular application, the memory including a plurality of banks, each bank including a plurality of rows, the method comprising:
    arranging data locations in the memory such that access commands for a particular application can be ordered so that consecutive memory accesses do not access different rows in a same bank of the memory, wherein blocks expected to be accessed consecutively under an access pattern of the particular application are either located in a same row in one bank or in rows in different banks of the memory; and wherein arranging comprises:
    arranging data locations in the memory in blocks of size "S" such that each block lies on a new burst boundary wherein:
    "S" is equal to "B" multiplied by "C" and divided by two, "B" being a minimum expected data transfer request amount associated with the particular application, "C" being equal to a nearest even number at or above a result of "A" divided by "B," "A" being a minimum data quantity that is an integer multiple of a burst size associated with the memory and "A" further being associated with a transfer time that is greater than or equal to a total of one or more memory timing parameters associated with the memory.

8. The method of claim 7 wherein the one or more memory timing parameters include at least one of row command delay ("tRCD"), row pre-charge delay ("tRP"), row address strobe delay ("tRAS").

9. The method of claim 7 wherein one half of "A" is an amount of data requiring a transfer time that is greater than a row pre-charge delay ("tRP") of the memory.

10. A method of managing memory access for reading data from a memory comprising:
    receiving data requests;
    generating a sequence of read commands to retrieve requested data from the memory; and
    determining if leaving the read commands in their generated sequence would require consecutive accesses to different rows in a same bank of the memory;
    if leaving the read commands in their generated sequence would not require consecutive accesses to different rows in a same bank of the memory, then leaving the read commands in their generated sequence; and
    if leaving the read commands in their generated sequence would require consecutive accesses to different rows in a same bank of the memory, then reordering the read commands so that consecutive accesses to the memory access either a same row in a same bank or a row in a first bank followed by a row in a second bank wherein reordering comprises switching an order of one or more pairs of consecutively generated read commands, data locations in the memory being organized for a particular application requesting data from the memory such that, when reordering is necessary, only said switching is done in the sequence during the entirety of normal operation for the particular application to avoid consecutive accesses to different rows in a same bank of the memory.

11. The method of claim 10 further comprising, if read commands have been reordered, reordering data read from memory so that it corresponds to a sequence of requested data.

12. Memory management circuitry for managing responses to requests for data in a memory, the memory management circuitry comprising:
  memory access command circuitry operable to receive requests for data in the memory; generate one or more access commands to access data from the memory; reorder the access commands, when necessary, to avoid consecutive accesses to different rows in a same bank of the memory; and provide signals usable for ordering data retrieved from the memory to satisfy a requested order;
  a first temporary storage circuit comprising a semi-FIFO, the semi-FIFO being operable to perform at least one of a read operation without using a read address or a write operation without using a write address, the semi-FIFO further being operable to use signals received from the memory access command circuitry to selectively reorder first data retrieved from the memory if the first data is out of order with respect to the requested order;
  a second temporary storage circuit operable for storing second data retrieved by read commands generated in advance of a request for the second data;
  input selection circuitry operable to receive signals from the memory access command circuitry for selecting between the first and second temporary storage circuits to receive data read from the memory; and
  output selection circuitry operable to receive signals from the memory access command circuitry for selecting between the first and second temporary storage circuits to provide as an output of the memory management circuitry.

13. The memory management circuitry of claim 12 wherein the second temporary storage circuit is also operable to selectively reorder second data retrieved from the memory if the second data is out of order with respect to a requested order.

14. The memory management circuitry of claim 12 wherein the input selection circuitry is a de-multiplexer including an input coupled to receive data read from the memory; a first output coupled to the first temporary storage circuit; and a second output coupled to the second temporary storage circuit.

15. The memory management circuitry of claim 14 wherein the output selection circuit is a multiplexer including a first input coupled to the first temporary storage circuit; a second input coupled to the second temporary storage circuit; and an output.

16. The memory management circuitry of claim 12 further comprising a read data reorder logic circuit coupled to control the input selection circuit, the read data reorder logic circuit being operable to control the input selection circuit to select the first temporary storage circuit to receive data read from the memory if the read data is part of presently requested data and to select the second temporary storage circuit if the read data part of data expected to be requested subsequently.

17. The memory management circuitry of claim 16 wherein the read data reorder logic circuit is coupled to provide write addresses to the first temporary storage circuit, the first temporary storage circuit being adapted to advance a read location in a sequential order, the reorder logic being operable to select write addresses for the first temporary storage circuit relative to the sequential order such that an order of at least portions of the read data are reversed if data read from memory is out of order relative to an order in which it was requested.

18. The memory management circuitry of claim 17 wherein the read data reorder logic is also coupled to provide write addresses to the second temporary storage circuit, the second temporary storage circuit being operable to advance a read location in a sequential order, the reorder logic being adapted to select write addresses for the second temporary storage circuit relative to the sequential order such that an order of at least portions of the read data are reversed if data read from memory is out of order relative to an order in which it was requested.

19. The memory management circuitry of claim 18 wherein the second temporary storage circuit is a scratch pad memory circuit.

20. An integrated circuit comprising the memory management circuitry of claim 12.

21. A data processing system comprising the integrated circuit of claim 20.

* * * * *